May 16, 1939.　　　　G. W. BUCHANAN　　　　2,158,689
APPARATUS FOR TREATING COMPLEX ORES
Filed March 23, 1937　　　　3 Sheets-Sheet 1
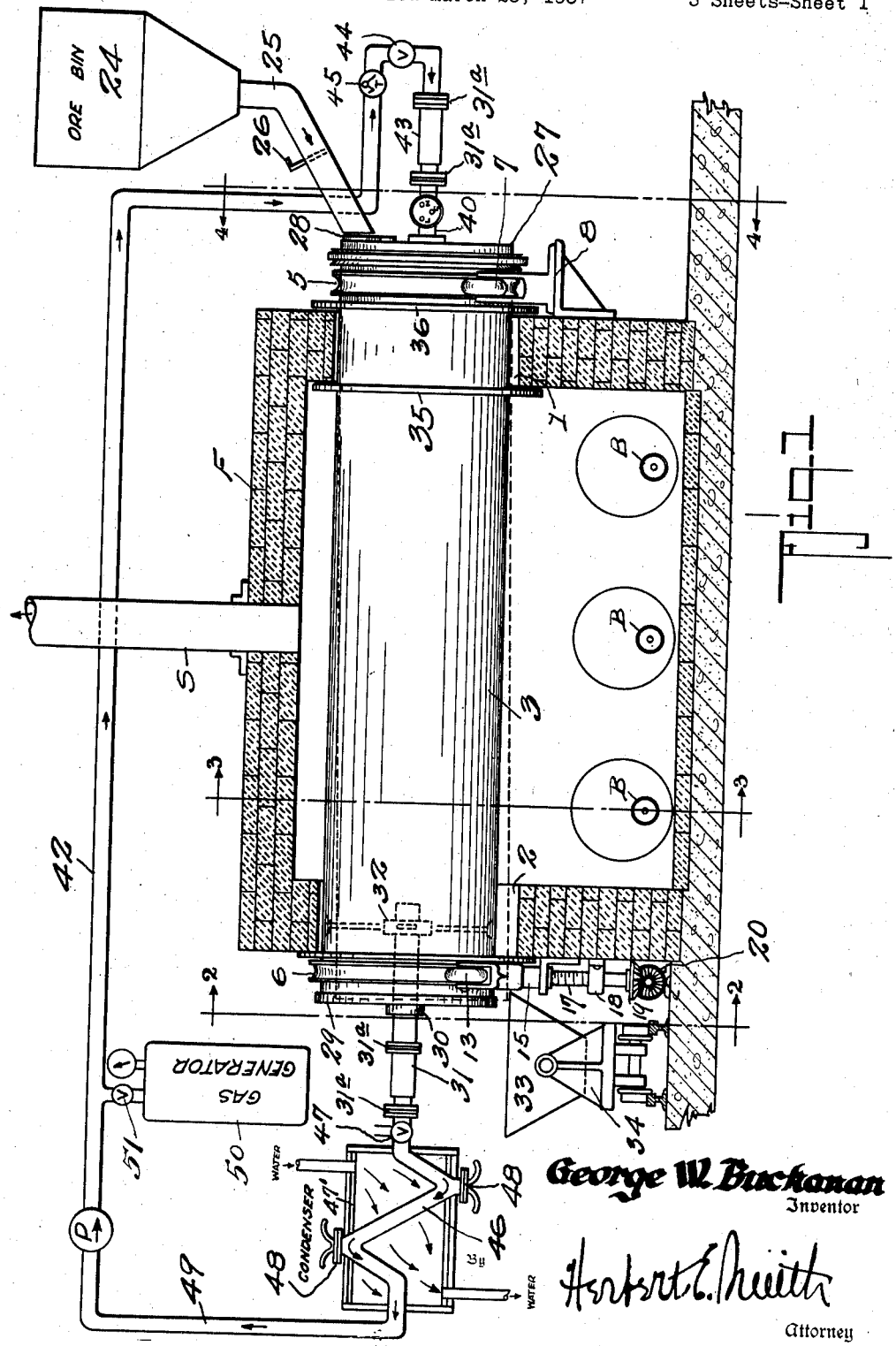
George W. Buchanan
Inventor
Herbert E. Smith
Attorney

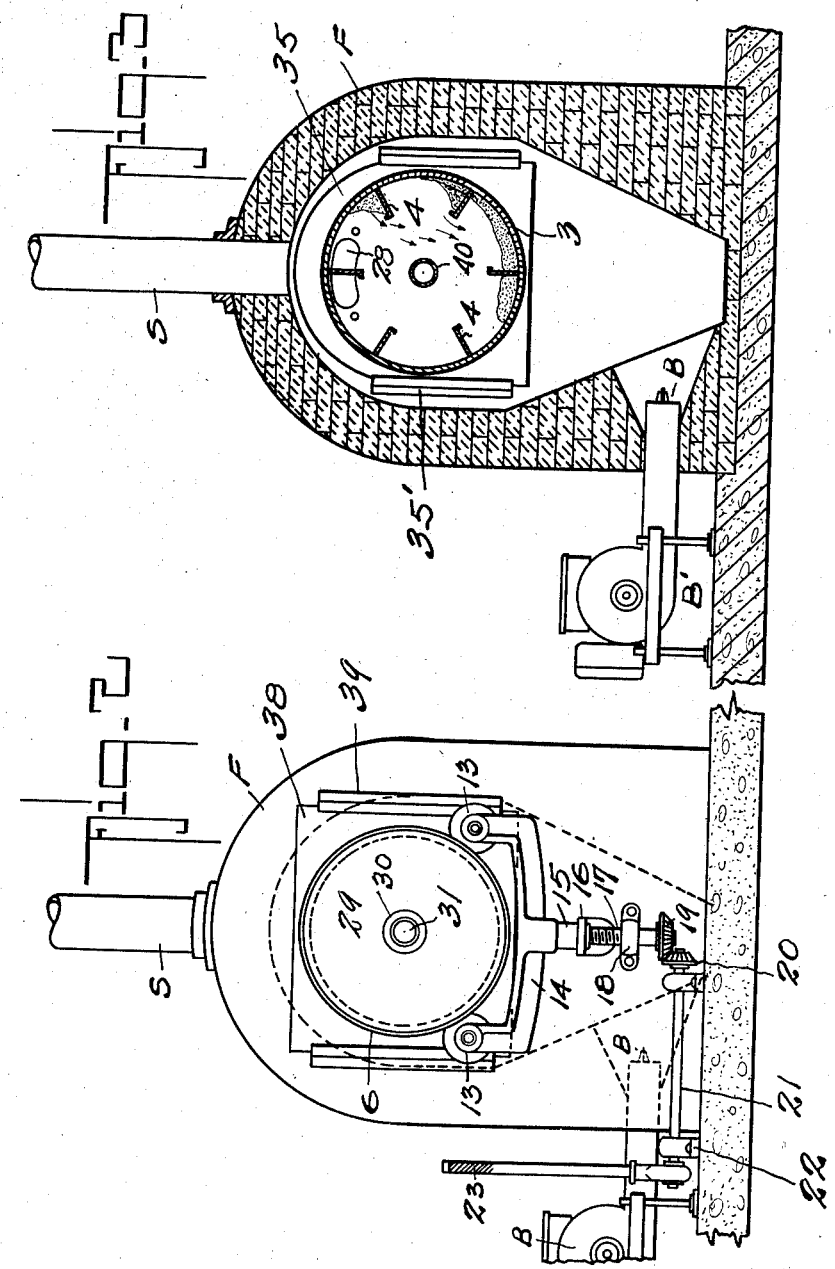

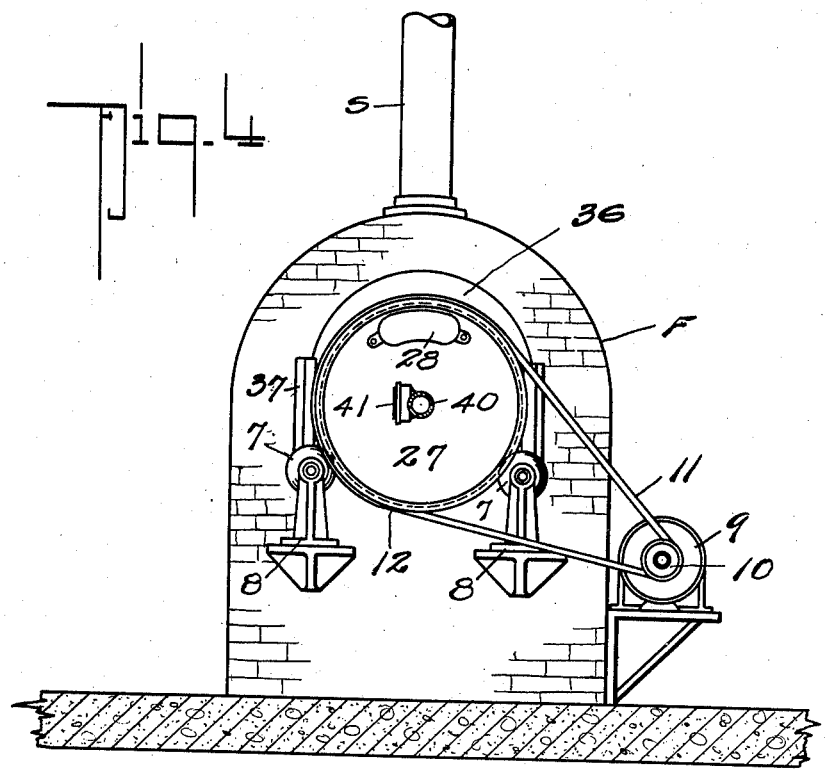

Patented May 16, 1939

2,158,689

UNITED STATES PATENT OFFICE 2,158,689

APPARATUS FOR TREATING COMPLEX ORES

George W. Buchanan, Pollock, Idaho, assignor to Metals Recovery Co., Inc., Spokane, Wash., a corporation of Idaho Application March 23, 1937, Serial No. 132,643

1 Claim. (Cl. 266—18)

My present invention relates to an improved apparatus for treating complex ores especially ores bearing gold and other precious metals. By the use of the apparatus of my invention I facilitate the subsequent treatment involving separation and recovery of the gold content of the ore. This subsequent treatment may be a cyanide process, or any other suitable method adapted for the purpose of separating the precious metal from its ore.

According to my invention, the reduction of the ore is accomplished by sublimation while the powdered ore is in sifted suspension and subjected to a controlled, indirect heat, together with a gas or gases, applied, preferably under pressure, to the suspended ore. The complex metallic elements of the ore that are known to interfere with the reduction of gold-bearing ore, are volatilized by the heat and gas, and the gaseous conveyor under pressure carries the volatilized elements to a suitable condenser for separate treatment of these extracted and removed elements.

As an example of the use of my apparatus I treat complex gold bearing ore to reduce and extract therefrom, by sublimation, the refractory metallic elements as tellurium, selenium, thallium, or complex sulphide ores, leaving the residue with its gold-bearing content in condition for subsequent separation or recovery of the precious metals, by standard methods of treatment.

In carrying out my invention I utilize an apparatus comprising a rotary, sifting, oven, in which the powdered ore is placed and from which air is excluded; controlled heat is applied to the oven and indirectly to the ore; and a closed circuit including the interior of the oven is employed for the circulation of gas or gases to sublime the undesired metallic elements; and this gaseous circulation is also used for conveying the sublimed or volatilized elements from the oven.

Due to the comparatively low, and controlled temperature of the indirectly applied heat, approximating from 300 degrees C., to 700 degrees C., which is far below the temperature required for the treatment of the gold-content of the ore, gold chloride is not formed in the chloridizing reaction of the gas employed in the oven; but on the other hand certain undesired interfering elements of the complex ore are sublimed, extracted, and conveyed from the gold bearing ore pulp in the oven.

In order that the general arrangement and utility of parts of the apparatus may readily be understood reference may be had to the accompanying drawings, in which:

Figure 1 is a longitudinal, vertical sectional view through a furnace, showing the rotary oven or drum, the closed gas circulation system, and other parts of the apparatus in elevation.

Figure 2 is a view in elevation at the discharge end of the furnace, showing the operating means for longitudinally tilting the oven for the discharge of gold-bearing ore pulp from the oven, as at line 2—2 of Figure 1.

Figure 3 is a vertical transverse sectional view at line 3—3 of Figure 1 looking toward the charging or feed end of the furnace.

Figure 4 is an elevation at the charging or feed end of the furnace, as at line 4—4.

In the exemplifying structures of the drawings I have illustrated a brick furnace F of well known type, having suitable heating units, as oil burners B arranged in the bottom of the fire chamber beneath the rotary oven 3 to equally distribute the heat for application to the oven, and for indirect application to the contents of the oven. The burners are provided with usual blowers B' and the products of combustion pass around the oven and out through the smoke stack S arranged at the approximate longitudinal center of the furnace. The opposite ends of the furnace are provided with openings or holes 1 and 2 for accommodation of the oven 3, which is fashioned in the form of a cylindrical drum, and these holes are of sufficient dimensions to permit longitudinal tilting of the rotary drum or oven, as will be described.

The oven is located within the fire chamber of the furnace with its opposite ends protruding from the furnace, and the drum is fashioned with an annular series of longitudinally extending interior vanes 4 extending radially toward the center of the drum from its annular wall, for the purpose of lifting and then sifting the powdered ore in suspension by rotary movement of the drum or oven, as indicated in Figure 3.

The protruding ends of the rotary oven are provided with exterior, grooved trunnions 5 and 6, the trunnions 5 at the charging end being supported upon spaced bearing rollers 7 that are mounted and journaled in brackets 8, and rotary movement is imparted to the roasting drum from a motor 9 through its drive pulley 10, belt 11, and the larger pulley 12 on the charging end of the drum.

For convenience in feeding the powdered ore, and for discharging the gold-bearing ore from the drum after the desired treatment of the ore pulp, the discharging end of the rotary oven, at the left in Figure 1 may be tilted downwardly to incline the drum, and for this purpose the trunnion 6 at the discharge end of the drum is supported upon a pair of spaced bearing rollers 13, which may be lowered or elevated, as indicated in Figure 2. The spaced supporting rollers are journaled in the ends of the arms of a yoke 14 having a central interiorly threaded socket head 15, which head is guided in its vertical movement in a guide bracket 16 attached to the furnace wall, and a screw bar 17 is threaded in the lower end of the socket-head and journaled in a bearing bracket 18 attached to the furnace wall, and the lower end of the screw bar is provided with a bevel gear 19. A second bevel gear 20, on the gear shaft 21, which is journaled in bearings 22, is turned with the shaft by means of a reversible ratchet lever 23, and this manually operated screw device is employed to elevate and depress the discharging end of the drum or oven.

The ore-pulp, which has previously been ground to powder form, is fed from an ore bin 24, through the chute 25, and past the control gate 26 in the chute, through an open manhole in the head 27 of the drum, and then the manhole is closed and sealed by the use of a cover plate 28 bolted against the exterior face of the charging head of the drum.

The gold-bearing ore that remains in the drum after a cycle of treatment, is withdrawn from the tilted oven or drum, through its open discharge end, after removal of the head 29 from the dischage end of the drum. This circular, flanged head is fashioned with a central slide hub 30 mounted on the fixed tubular extension or nozzle 31, which has exterior flexible joints as 31a, and within the drum or oven, this nozzle is supported at the center of a spider frame 32 rigidly fixed to the interior face of the rotary drum or oven.

After the head 29 has been slid to open position, and the oven has been longitudinally tilted to depress the discharge end of the oven, and of course, while the drum is not revolving, the gold-bearing ore is deposited in a car 33 on the rails 34 extending transversely of the furnace in Figure 1, and this gold bearing ore is carried away for further treatment.

The ends of the rotary drum or oven protrude through the openings 1 and 2 of the furnace wall, and these openings are closed and guarded against escape of gases of combustion by means of interior collars 35 and exterior collars 36 mounted on the drum, the former being guided in grooved guides 35' and the latter in similar guides 37, when the drum or oven is being tilted for discharge, or restored to its horizontal position for a cycle of treatment of the ore. At the discharge end of the oven exterior sealing plate 38 is guided in its grooved guide brackets 39 attached to the end wall of the furnace.

At the discharge end of the oven, the central tube or nozzle 31 is provided for the outlet of the circulating gaseous elements, and at the charging end of the drum, the head 27 is provided with an intake nipple 40 for the circulating gas that is supplied through pipe 42 from the pump P in Figure 1, and the nipple has a connection 43 made flexible by the use of joints 31a. A cut off valve 44 is used adjacent the charging end of the drum to close gas circulation while the drum is being unloaded and loaded, and a check valve 45 is also used in the gas supply pipe to prevent back pressure.

For the sublimation of the undesired metallic elements of the complex ore I preferably utilize chlorine dry gas or sulphur monochloride gas, which accomplish the chemical change or volatilization of these elements in a suitable manner, and the treating gas is utilized as a conveyer to carry the volatilized products to zig-zag coils 46 in a condenser located in the closed gas-circulating system between the pump P and the discharge end of the roasting oven. A three-way valve 47 is provided in the gas circuit between the discharge end of the oven and the condenser, and the condenser which is shown with a water-cooled jacket 47' is provided with clean-out heads 48 at the bends in the zig-zag coil. A gas pipe 49 connects the condenser with the pump P at the intake side of the latter, and the pump of course forces the gas therefrom through its outlet side into the supply pipe 42.

A gas generator 50 is provided to replenish the supply of gas to the supply pipe 42, and a cut-off valve 51 controls the admission of such gas from the generator to the supply pipe.

The gas circulating system is a closed circuit, and the circulation is initiated from the pump P through the charging end of the oven, and for the purpose of excluding air from the interior of the oven the three-way valve 47 is turned to cut-off communication with the condenser and to open communication to the atmosphere. After the introduction of gas under pressure from the pump to the oven, which thereby excludes air from the oven, the three-way valve 47 is turned to close its atmospheric port and open its main port to the outlet nozzle at one side and the condenser at the other side of the valve.

A charge of powdered ore having been fed to the interior of the roasting oven as described, and the ends of the oven having been closed, the burners B are operated to raise the temperature within the heating chamber of the furnace to the desired degree for the purpose of applying the heat, indirectly, to the contents of the oven. The rotary oven is revolved as described to sift and suspend, successively, the "takes" of ore from the bottom of the oven, and the powdered ore is picked up and sifted as indicated in Figure 3.

After the air has been excluded from the interior of the oven as described, the pump P is operated to force the gas, supplied from the generator 50, through the pipe 42 in the direction of the arrows, and with the valves properly set the gas is forced under pressure through the revolving oven in close contact with the sifting ore.

The undesired metallic elements of the ore are sublimated or volatilized, due to the chemical reaction set up in the oven, and the volatilized elements are carried by the reducing gas or volatilizing agent out of the oven to the coils of the condenser where these volatilized elements are condensed, and later, the clean-out heads 48 are employed for removing the condensate. After this extraction, by condensation, of the volatilized elements, the free reducing gas is drawn from the condenser to the pump P and again forced through the closed circuit to and through the oven, the valve 51 being opened at intervals to replenish the supply of reducing gas as required.

After the required period of time for an efficient operating cycle, the burners are lowered, as a large quantity of the reducing gas is salvaged from the oven, and then the valves 44 and 47 are closed to cut off both ends of the roasting oven from the circulating circuit. The discharge door 29 is opened, and the discharge end of the oven is lowered or depressed and the gold-bearing ore remaining in the oven is deposited in the waiting car 33.

The oven is then restored to operating position, door 29 is closed, and the man-hole cover 28 is removed to admit a succeeding charge of the powdered ore to the interior of the roasting oven, and the treating cycle is repeated.

The temperature employed in the furnace varies in accord with the material treated and complexity of the various undesired metallic elements of the ore, but in all cases the temperature is maintained to a considerable degree below the fusing point of the precious metals of the ore.

By the use of indirect heat conducted from the exterior to the interior of the roasting oven, i. e. through the cylindrical wall of the rotating oven, the gases of combustion from the furnace are kept out of contact with the reducing gas in the closed circulating system, and out of contact with the gas and ore in the interior of the roasting oven.

While I have referred to dry chlorine gas as the reducing agent for the undesired metallic elements, it will be understood that other reducing gas or gases, as for instance sulphur monochloride, may be utilized under some conditions as the reducing agent.

Having thus fully described my invention, what I claim as my invention and desire to secure by Letters Patent is:

An apparatus for treating ores in a closed circuit comprising a heating furnace having alined openings therein for the reception of a rotary oven forming part of a closed circuit, one of said openings being larger than the other, fixed bearing rollers on the furnace adapted to rotatably support one end of said oven, vertically adjustable bearing rollers on the furnace adapted to rotatably support the other end of the oven and being located adjacent the larger opening, means for elevating or lowering said adjustable rollers, means for supplying reducing gas under pressure to said circuit, and a condensor in said circuit for extracting the volatilized elements from the reducing gas.

GEORGE W. BUCHANAN.